United States Patent
Bertolini et al.

(10) Patent No.: US 12,241,505 B2
(45) Date of Patent: Mar. 4, 2025

(54) SUPPORT ASSEMBLY FOR FOOD APPLICATIONS

(71) Applicant: AKTIEBOLAGET SKF, Gotenborg (SE)

(72) Inventors: Andrea A. Bertolini, Carrara (IT); Fausto Baracca, Massa (IT); Fabio Cavacece, Rome (IT)

(73) Assignee: AKTIEBOLAGET SKF (SE)

( * ) Notice: Subject to any disclaimer, the term of this patent is extended or adjusted under 35 U.S.C. 154(b) by 97 days.

(21) Appl. No.: 18/167,374

(22) Filed: Feb. 10, 2023

(65) Prior Publication Data

US 2023/0265887 A1     Aug. 24, 2023

(30) Foreign Application Priority Data

Feb. 21, 2022   (IT) .................. 102022000003104

(51) Int. Cl.
*F16C 33/78*    (2006.01)
*F16C 19/06*    (2006.01)

(52) U.S. Cl.
CPC .......... *F16C 33/7823* (2013.01); *F16C 19/06* (2013.01)

(58) Field of Classification Search
CPC .. F16C 23/084; F16C 33/782; F16C 33/7823; F16C 33/7826; F16C 33/7876; F16C 33/7886
See application file for complete search history.

(56) References Cited

U.S. PATENT DOCUMENTS

| 2003/0039422 | A1 | 2/2003 | Nisley et al. | |
| 2015/0345562 | A1* | 12/2015 | Varnoux | F16C 19/06 384/484 |
| 2018/0100546 | A1* | 4/2018 | Ress | F16C 33/723 |
| 2019/0010989 | A1* | 1/2019 | Falaschi | F16C 33/7853 |
| 2022/0325754 | A1* | 10/2022 | Baracca | F16C 33/7886 |

FOREIGN PATENT DOCUMENTS

| EP | 2985482 A2 * | 2/2016 | ......... F16C 33/7886 |
| FR | 2515288 | 4/1983 | |
| WO | 20140060042 | 4/2014 | |

OTHER PUBLICATIONS

International Search Report for corresponding Italy Patent Application No. 102022000003104 dated Oct. 5, 2022.

* cited by examiner

*Primary Examiner* — James Pilkington
*Assistant Examiner* — Aimee Tran Nguyen
(74) *Attorney, Agent, or Firm* — Reed Smith LLP

(57) ABSTRACT

A support assembly for moving shafts, comprising a bearing unit positioned in a casing, and a cover for fluid sealing the casing. The support assembly comprises double level of protection provided by two distinct sealing devices that keep the bearing unit protected from washing liquid even in the most demanding conditions of use. The better sealing configuration aids in overall better sealing of the bearing unit; greater resistance to contaminants; and improving the sealing performance of the whole support assembly.

5 Claims, 2 Drawing Sheets

SUPPORT ASSEMBLY FOR FOOD APPLICATIONS

CROSS-REFERENCE TO RELATED APPLICATIONS

This application is based on and claims priority to Italian Patent Application No. 102022000003104 filed on Feb. 21, 2022, under 35 U.S.C. § 119, the disclosure of which is incorporated herein by reference in its entirety.

SUMMARY

The present disclosure relates to a support assembly for food applications. In particular, the support assembly is fixed to a machine frame and is intended to support movable shafts, for example, rotating shafts, by means of a bearing unit, in order to improve the sealing performance against water and detergents at high pressure and temperature.

As is known in the food industry (also known as "Food and Beverages," or simply F&B), there is a need to develop new machines and machine components for improving food safety and quality. The machines currently used in the food industry have numerous moving parts supported by rotating shafts, such as conveyor belts, mixers, and machines for washing fresh foods.

In the case of rotating shafts, the known support assemblies may be of the terminal type, in which a terminal end of the shaft is housed, or of the through type, and, in the first case, the support assembly is formed by a casing, usually annular, having a base or flange for fixing to the machine, a bearing unit, located inside the casing and coupled to the movable shaft, and a cover, normally cup-shaped, which is coupled to the casing in such a way as to form a fluid seal with the casing itself. On the opposite side of the bearing unit from the cover, known support assemblies have a sealing device, which is associated with the casing to protect the bearing unit, and which may include a metal shield and a vulcanized rubber co-moulded on the metal shield to form one or more sealing lips. In addition to the sealing device associated with the casing to protect the bearing unit, support assemblies may also have further sealing devices, positioned on opposite sides of the bearing unit, which interact directly with the bearing unit itself for its protection.

The aforesaid machines used in the food industry have to be cleaned frequently, usually with water to which detergents and/or disinfectants have been added, in order to control any development of bacterial colonies that might contaminate food. Furthermore, these machines and/or their components may not have any gaps or other parts where dirt, or simply the washing water, can penetrate and stagnate, since the stagnation of liquids or moisture promotes the possible proliferation of bacteria.

In order to obtain certification for the IPx9k test, the support assembly may withstand high-pressure jets of hot water, and the tests conducted on known support assemblies have shown that, even if the side having the cover is able to withstand the conditions imposed by the test specifications, the opposite side, where the sealing device associated with the casing is mounted, cannot withstand the same conditions, since the high-pressure jet of hot water causes the lifting of the sealing lips of the sealing device, resulting in the ingress of water into the support assembly, which, in-turn overtime results in proliferation of bacteria.

The object of the present disclosure is to provide a novel support assembly for food applications that is capable of meeting the conditions imposed by the test specifications, which are far more stringent than the normal operating conditions, while also being capable of withstanding the normal operating conditions over a long period, without being more expensive and/or difficult to produce.

According to the present disclosure, a support assembly for food applications, having the characteristics defined in the attached claims, is provided.

BRIEF DESCRIPTION OF THE DRAWINGS

The disclosure will now be described with reference to the attached drawings, which show an exemplary embodiment, in which.

DETAILED DESCRIPTION

Figure 1:
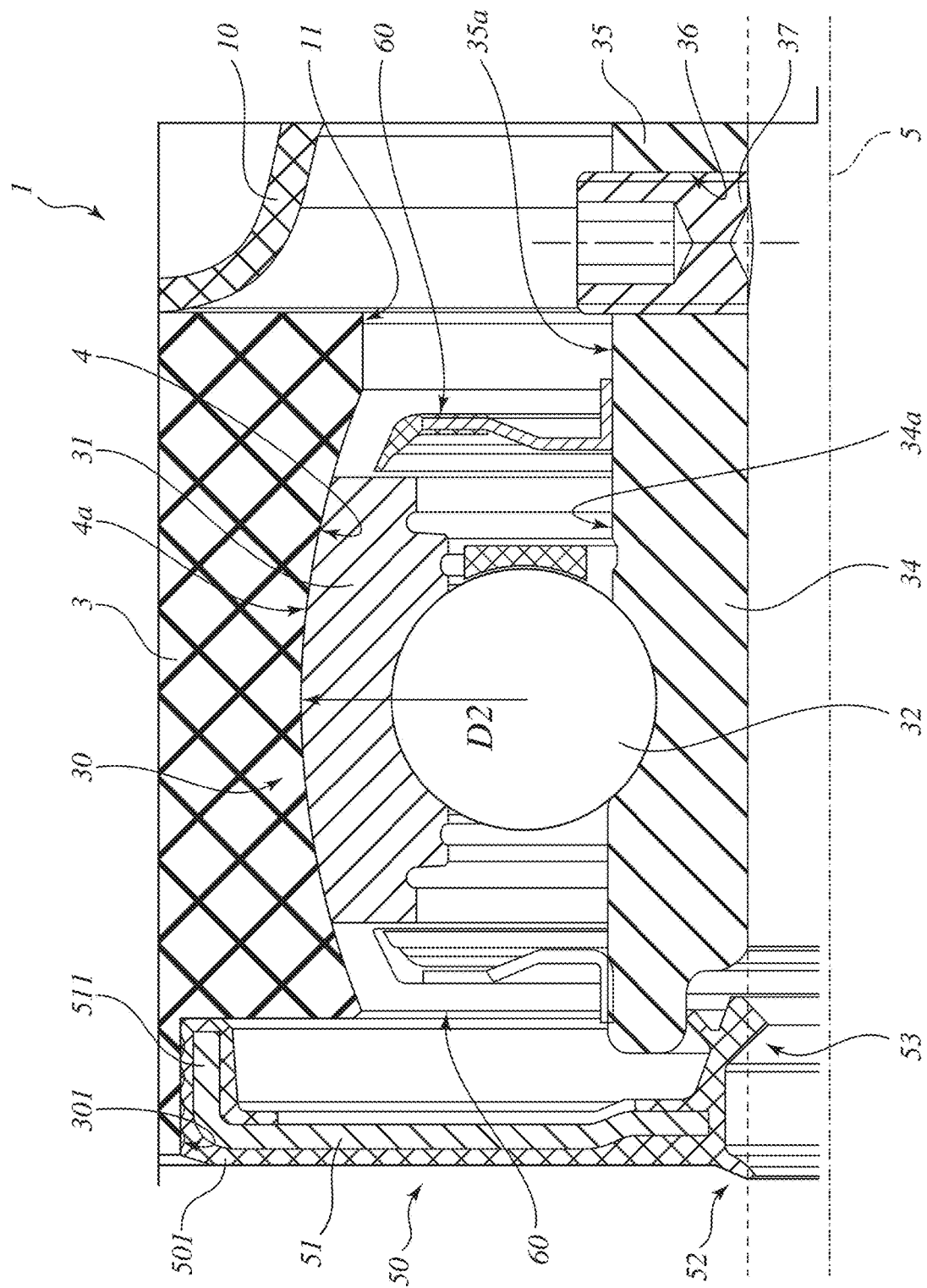
FIG. 1 shows, in cross section, an exemplary embodiment of the support assembly.

With reference to FIG. 1, the number 1 indicates a support assembly, particularly one that is intended to be mounted on machines for the food industry for supporting a movable, rotating or slide-able shaft. The shaft being shown purely schematically in FIG. 1 for the sake of simplicity and being indicated by 5.

The support assembly 1 may include a casing 3 for fixing the support assembly 1 to the machine. The support assembly 1 comprising an internal through seat 4, and a bearing unit 30, for example a rolling bearing unit of a known type, which in turn may include a radially outer ring 31 mounted inside the seat 4, a radially inner ring 34, and a row of rolling elements 32, such as balls, to allow the rotation of the radially inner ring 34, engaged by the shaft 5, relative to the radially outer ring 31 and relative to an axis of rotation X.

The support assembly 1 may further comprise a cover 10, shown partially in FIG. 1, which has an overall cuplike shape so as to be sealingly coupled to the casing 3, and which closes an opening 11 of the seat 4 of the casing 3 in a fluid-tight way. When the support assembly 1 is mounted on a machine for the food industry, the cover 10 is placed on an outer side of the machine, and thus usually forms a front part of the support assembly 1.

Throughout the present description and claims, terms and expressions indicating positions and orientations such as "radial" and "axial" are to be interpreted as relative to the central axis of rotation X of the bearing unit 30 as would be appreciated by a skilled artisan. On the other hand, expressions such as "axially outer" and "axially inner" relate to the assembled condition of the support assembly, and in particular relate to a cover side and to a side opposite the cover 10, respectively.

The radially outer ring 31 of the support assembly 1 is an externally convex ring, or is coupled into the seat 4 by means of a spherical surface 4a so as to withstand any eccentricity and/or flexion of the shaft 5 relative to the casing 3, and has an axial width L1 that is smaller overall than an axial width L2 of the casing 3. The radially inner ring 34 of the support assembly 1 is internally engaged by the shaft 5, has an overall axial width L3 that is substantially equal to the width L1, and has, on the side of the cover 10 and in addition to the width L3, a tubular locking collar 35. The tubular locking collar 35 is an integral part of the radially inner ring 34, being made in one piece with the latter, and which extends axially beyond the radially outer ring 31. The tubular locking collar 35 has a threaded through hole 36 for the insertion of a grub screw 37 for positioning and fixing the radially inner ring 34 on the shaft 5.

Figure 2:
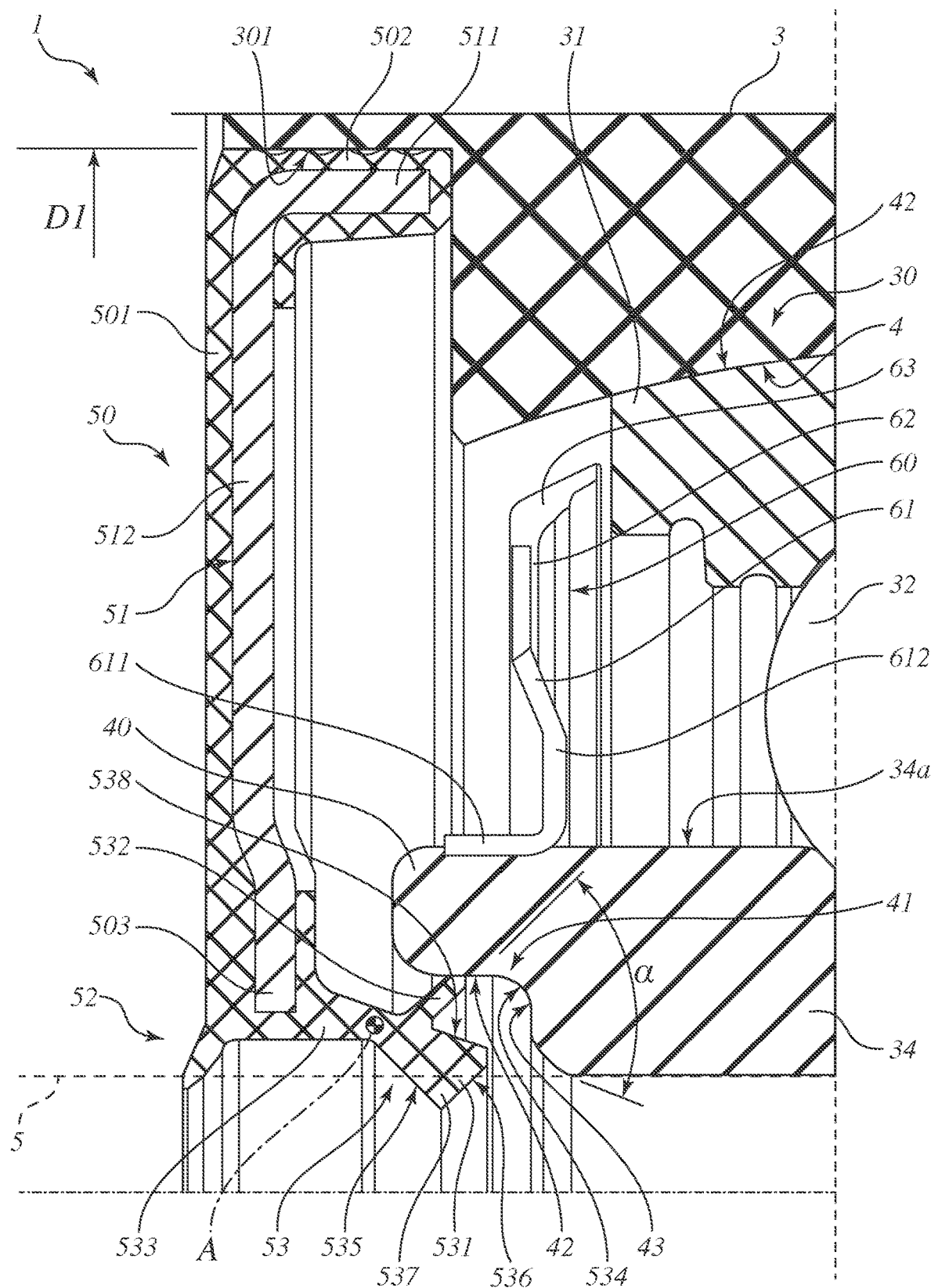
FIG. 2 shows a detail of a portion of FIG. 1 on an enlarged scale.

Additionally, the radially inner ring 34 and the tubular locking collar 35 are radially delimited towards the outside by respective contiguous and continuous cylindrical surfaces 34a and 35a. Further, the radially inner ring 34 also has, on the opposite side from the collar 35, a tubular axial prolongation 40, as shown in FIG. 2. The tubular axial prolongation 40 extends in an axially outward direction from the radially outer ring 31 to form an undercut 41 delimited by two half-planes 42 and 43, which form a right dihedral between them. Wherein, the half-plane 42 is a cylindrical plane while the half-plane 43 is an annular plane. The tubular axial prolongation 40 also forms a surface 40a prolonging the surface 34a beyond the radially outer ring 31, as illustrated in FIG. 2.

For the purpose of sealing the seat 4 of the casing 3 in a fluid-tight way, the support assembly 1 may include, on the side opposite that of the cover 10, a sealing device 50. In other words, the sealing device 50 is on a respective rear part thereof, at a position where the axial mounting space is usually smaller than the axial front space. The sealing device 50 is positioned on the opposite side of the bearing unit 30 from the cover 10, and may include, as shown more fully in FIG. 2, a metal shield 51 and a vulcanized rubber coating 501, which covers practically the whole of the metal shield 51. The metal shield 51 comprises a cylindrical mounting portion 511 mounted in a cylindrical seat 301 of the casing 3, and includes a transverse flanged portion 512 integral with the portion 511 and extending from the portion 511 towards the shaft 5, transversely to the axis X.

The cylindrical seat 301 is placed outside the seat 4, laterally with respect to the seat 4 itself, and has an inside diameter D1 which is greater than a maximum outside diameter D2 of the spherical surface 4a, and the sealing device 50 extends radially from the cylindrical seat 301 to beyond the tubular axial prolongation 40, so as to come into sliding contact with the shaft 5 in order to fully protect the seat 4.

The vulcanized rubber coating 501 comprises a corrugated cylindrical element 502 covering the outside of the mounting portion 511 to provide a fluid seal between the metal shield 51 and the casing 3, and, further provides stability of mounting for the metal shield 51. The corrugated cylindrical element 502 also comprises two sealing lips 52 and 53 extending radially and axially on opposite sides, starting from a terminal end 513 of the flanged portion 512, so as to come into sliding contact with the shaft 5, of which lips the lip 52 is an axially outer lip. In other words, sealing lip 52 faces the rear part of the support assembly 1, capable of coming into radial contact with the shaft 5, while the sealing lip 53 is an axially inner lip, also capable of coming into radial contact with the shaft 5 and of interacting, as explained more fully below, with the radially inner ring 34.

Further, the sealing lip 53 is composed of a main lip 531 and a secondary lip 532, which is carried by the main lip 531 and forms an acute angle α of specified size with the main lip 531. The main lip 531 is hinged at a hinge A on a root portion 533 of the sealing lip, and, extends from the hinge A towards the inside of the undercut 41, forming a labyrinth seal 534 with at least the half-plane 43.

As shown in FIG. 2, the main lip 531 is delimited radially, on the opposite side from the secondary lip 532, by two conical surfaces 535 and 536 that converge on each other to form a contact edge 537 with the shaft 5, of which surfaces the conical surface 536 is a mounting surface. In other words, the main lip 531 includes a taper such as to facilitate the mounting of the sealing device 50 on the shaft 5 while avoiding undesired deformation of the lip 53. On the other hand, the secondary lip 532 is placed in a sliding contact with the half-plane 42, and forms with the main lip 531 a backflow surface 538, which has a wedge-shaped section in the plane of FIGS. 1 and 2, with a size equal to the size of the angle α. Additionally, the secondary lip 532 comprises a thickness that is smaller, or much smaller, than the thickness of the main lip 531, so as to increase the flexibility of the main lip 531 itself, which, conversely, has a greater rigidity than the secondary lip 532.

For ease of reference, the two sealing lips 52 and 53 are shown in their pre-assembly configuration, in which the effect of their engagement with the shaft 5 is not visible. Whereas, when the two sealing lips 52 and 53 are engaged by the shaft 5, in other words when they are positioned in their assembly configuration, the sealing lip 52 is rotated radially outwards, thereby increasing its inclination relative to the axis X, the same action taking place for the sealing lip 53, but with the additional effect that the main lip 531, which has to rotate around the hinge A and has a greater rigidity than the secondary lip 532, tends to flatten the latter against the surface 42, thus reducing the size of the angle α.

The benefits of the different characteristics of the main lip 531 and the secondary lip 532 are fully evident during routine maintenance operations on the support assembly 1, in which the assembly is struck by high-pressure jets of hot water. In this situation, in which the sealing device 50 may prevent, with the greatest possible efficiency and efficacy, the ingress of liquids into the seat 4, that is to say into the casing 3. If these liquids introduced by high-pressure jets are able to penetrate, they are able to do so not so much as a result of their pressure, but as a result of a possible external anomalous condition of excess pressure, under the sealing lip 52 and even under the main lip 531 of the sealing lip 53. As a result, the main lip 531 will tend to rotate even further around the hinge A, so that it simultaneously: reduces the dimensions of the labyrinth seal 534 with the surface 43; progressively reduce the dimensions of the labyrinth seal 534 formed by the main lip 531 with the surface 42 as the seal radially approaches the surface 42, thereby increasing its capacity to withstand the ingress of liquids towards the secondary lip 532; and reduce the size of the acute angle α, thereby increasing the extent of the sliding contact of the secondary lip 532 against the surface 42. In other words, further increasing the capacity to withstand the ingress of the liquids towards the seat 4, so that these liquids would not only be retarded along their path towards the seat 4 but would also be pushed back along their path by the backflow surface 538.

In order to obtain maximum protection of the bearing unit 30, the support assembly 1 may include within itself further sealing device 60, which in turn is positioned both on the axially outer side and on the axially inner side of the row of rolling bodies 32. The sealing device 60 comprise of the same structure, but, depending on the applications of the support assembly 1, it could also have different structures from each other, and possibly more complex structures.

The sealing device 60 can be positioned on the axially inner side, where the space is reduced to an essential minimum, because of the use of the tubular prolongation 40. The sealing device 60 may comprise, a single metal shield 61 having a cylindrical mounting portion 611 interference-fitted on the prolongation surface 40a of the radially inner ring 34, and having a shaped flanged portion 612 integral with the portion 611; a vulcanized rubber coating 62 partially covering the shield 61, particularly the flanged portion 612; and a non-contacting sealing lip 63 which is part of the coating 62, and which extends from the flanged portion 612 of the metal shield 61 so as to be positioned laterally relative to the outer ring 31.

Although sufficient axial space is available on the side of the cover 10, and the radially inner ring 34 may have an axial extension represented by the tubular collar 35, on which the corresponding sealing device 60 can be mounted without difficulty, on the opposite side, where the axial mounting space is usually small if not actually insufficient, the prolongation 40 also makes it possible to create a seat for mounting the corresponding sealing device 60, and also, especially and possibly in combination, to create the undercut 41 in which the lip 53 with its main portion 531 and its secondary portion 532 can be housed without the need to occupy any other axial space outside the axial limits of the casing 3.

Furthermore, the double level of protection provided by the sealing device 50 and the sealing device 60 ensures that, even in the most demanding conditions of use and routine maintenance, the bearing unit 30 is fully protected, thus greatly increasing its service life, since, in the unlikely event that the washing liquid were able to pass beyond the barrier provided by the sealing device 50, it would still have to pass through the whole of the sealing device 60 before it could enter the bearing unit 30. Additionally, the presence of the undercut 41 causes any liquids to rebound from the surfaces 41 and 42 of the radially inner ring 34, thus keeping them near to the main and secondary lips 531 and 532 of the sealing device 50, and at a distance from the sealing device 60.

In summary, the introduction of the undercut 41 in the radially inner ring 34 and the sealing lip 52 with its specific forked configuration of the main lip 531 and the secondary lip 532, yields the following benefits: better sealing of the bearing unit; greater resistance to contaminants; the obtaining of IPx9k certification for the support assemblies; and an improvement in the sealing performance of the whole support assembly.

In addition to the embodiment of the disclosure as described above, it is to be understood that there are numerous other variants. It is also to be understood that these embodiments are described solely by way of example and do not limit the object of the disclosure or its applications or its possible configurations. On the contrary, although the description given above enables a person skilled in the art to implement the present disclosure according to at least one example of its embodiment, it is to be understood that numerous variations of the components described are possible without departure from the object of the disclosure as defined in the appended claims, which are interpreted literally and/or according to their legal equivalents.

We claim:

1. A support assembly for moving shafts, comprising:
a bearing unit comprising a radially outer ring and a radially inner ring configured to receive the moving shaft;
a casing for the bearing unit;
a cover for fluid sealing an opening of the casing;
a first sealing device positioned axially on an opposite side of the bearing unit from the cover, the first sealing device comprising a first shield and a first coating made of vulcanized rubber having a first, axially outer, sealing lip and a second, axially inner, sealing lip;
wherein, the radially inner ring comprises a tubular axial prolongation extending in an axially outward direction from the radially outer ring to form an undercut delimited by two surfaces and engaged by the second sealing lip; the second sealing lip is positioned in sliding contact with a first surface of the two surfaces;
wherein the second sealing lip comprises a main lip and a secondary lip, which is carried by the main lip, the secondary lip is positioned in sliding contact with the first surface of the two surfaces, and forms an acute angle (a) with the main lip.

2. The support assembly of claim 1, wherein the two surfaces form a right dihedral between them, and wherein the first surface of the two surfaces is a cylindrical plane in sliding contact with the secondary lip; and a second surface of the two surfaces is an annular plane forming a labyrinth seal at least with the main lip.

3. The support assembly of claim 2, wherein the main lip comprises a hinge point (A) with the first rubber coating such that the main lip is configured to reduce the size of the acute angle (a) upon rotation caused by external excess pressure, and wherein the rotation of the main lip causes an increase in the extent of the sliding contact of the secondary lip with the first surface of the two surfaces.

4. The support assembly of claim 3, wherein the main lip is delimited radially, on the opposite side from the secondary lip, by two conical surfaces that converge on each other to form a contact edge with the shaft, and wherein a first conical surface of the two conical surfaces is a mounting surface.

5. The support assembly of claim 4, further comprising, a second sealing device interposed between a row of rolling bodies and the first sealing device, the second sealing device comprising a second shield and a second vulcanized rubber coating with a sealing lip behind the bearing unit, wherein the tubular axial prolongation of the radially inner ring forms a mounting seat for the second sealing device.

* * * * *